(12) United States Patent
Norwood et al.

(10) Patent No.: US 6,473,551 B2
(45) Date of Patent: Oct. 29, 2002

(54) THIN FILM OPTICAL WAVEGUIDES

(75) Inventors: Robert A. Norwood, West Chester, PA (US); Chia-Chi Teng, Piscataway, NJ (US)

(73) Assignee: Photon-X, Inc., Malvern, PA (US)

( * ) Notice: Subject to any disclaimer, the term of this patent is extended or adjusted under 35 U.S.C. 154(b) by 0 days.

(21) Appl. No.: 09/994,722

(22) Filed: Nov. 28, 2001

(65) Prior Publication Data

US 2002/0064361 A1 May 30, 2002

Related U.S. Application Data

(60) Provisional application No. 60/253,078, filed on Nov. 28, 2000.

(51) Int. Cl.[7] .................................................. G02B 6/10
(52) U.S. Cl. ................................................... 385/130
(58) Field of Search .......................... 385/130–133, 385/129, 141, 147, 14, 18, 24, 49, 143, 145, 2; 372/20, 21; 264/1.7, 2.7

(56) References Cited

U.S. PATENT DOCUMENTS

| | | | |
|---|---|---|---|
| 513,682 A | * 1/1894 | Hesse | ........................... 460/19 |
| 4,749,245 A | 6/1988 | Kawatsuki et al. | .......... 427/163 |
| 5,046,800 A | * 9/1991 | Blyler et al. | ................. 264/1.7 |
| 5,155,620 A | * 10/1992 | Gordon et al. | .............. 359/328 |
| 5,170,461 A | * 12/1992 | Yoon et al. | .................. 385/122 |
| 5,483,612 A | * 1/1996 | Gallagher et al. | ........... 385/124 |
| 5,985,084 A | * 11/1999 | Summersgill et al. | ... 156/273.7 |
| 6,097,871 A | * 8/2000 | De Dobbelaere et al. | ... 385/129 |
| 6,343,171 B1 | * 1/2002 | Yoshimura et al. | ........... 385/14 |

FOREIGN PATENT DOCUMENTS

| | | |
|---|---|---|
| EP | 0 454 590 | 10/1991 |
| EP | 0 884 610 | 12/1998 |

\* cited by examiner

*Primary Examiner*—Akm E. Ullah
(74) *Attorney, Agent, or Firm*—Finnegan, Henderson, Farabow, Garrett & Dunner, L.L.P.

(57) ABSTRACT

An optical waveguide comprising a first polymeric layer and a second polymeric layer adjacent to the first polymeric layer and a method for making the optical waveguide are disclosed. The first polymeric layer has a refractive index of $n_1$ and solubility $S_1$ in a first solvent. The second polymeric layer has a refractive index of $n_2$ and solubility $S_2$ in the first solvent. In the optical waveguide, $n_1 \neq n_2$ and $S_1/S_2$ is at least 5.

33 Claims, 3 Drawing Sheets

THIN FILM OPTICAL WAVEGUIDES

Field of the Invention

The present application claims benefit of U.S. Provisional Application No. 60/253,078, filed on Nov. 28, 2000, and is incorporated by reference in its entirety herein.

The present invention generally relates to thin film optical waveguides and methods for forming thin film optical waveguides.

BACKGROUND OF THE INVENTION

Thin film optical waveguides are increasingly used to provide advanced functions in optical communications networks such as, for example, splitting, wavelength multiplexing and demultiplexing, optical add/drop multiplexing, variable attenuation, modulation, switching and amplification. Thin film optical waveguides provide reduced size and higher reproducibility than conventional fiber-based solutions.

Polymers of high optical quality may be used to form thin film waveguides using low temperature lithographic processes. Polymeric thin film waveguides can be used to make splitters, wavelength multiplexers and demultiplexers, optical add/drop muxes, variable attenuators and switches, when coupled with thermo-optic actuation. Various polymers have also been developed to address modulation and amplification functions.

Typically, thin film polymer waveguides comprise multiple adjacent thin films formed by, for example, spin coating. In the production of thin film optical waveguides, it is desirable to build successive layers of material with slightly different optical properties, such as refractive indices, in order to tailor the optical properties of the particular optical waveguide. For example, one can make a thin film optical waveguide, or other structures that confine and channel light, from certain polymers by forming polymers having different compositions on top of one another. The refractive index of a guiding, or core, layer must be higher than the refractive index of buffer and cladding layers so that the optical modes can be conducted into the core layer by internal reflection.

A conventional method for forming a thin film polymeric waveguide is to select different co-polymers within a particular polymer/co-polymer system for adjacent thin film layers. That is, for each layer, one selects polymers/co-polymers with different refractive indices. However, in conventional thin film polymeric waveguides, the various polymers/co-polymers have similar composition and thus they also have similar solubility. For fabrication, the polymer that will eventually form the thin film layer is dissolved in a suitable solvent before spin coating. The polymer/solvent solution is spin coated onto a substrate and then subsequently dried, for example, on a hot plate or in an oven, to remove the solvent, leaving the thin film layer behind. The drying process, however, typically causes stress fields in the resultant polymer thin film layer. In addition, when the next layer of polymer is applied, the underlying dried polymeric thin film can experience significant additional stress from solvent swelling.

Solvent swelling readily occurs if the polymers in the two adjacent polymer thin film layers are substantially soluble in the same solvent. This effect is aggravated as additional layers having substantially the same solubility in the solvent are added. These stresses cause optical scattering, resulting in performance degradation. Solvent swelling also causes crazing, cracking, and de-lamination of the entire polymeric waveguide structure, resulting in greatly reduced reliability, and in some cases, component failure.

In addition to stress caused by solvent swelling, selection of different co-polymers within a particular polymer/co-polymer system for adjacent thin film layers may cause a dissolution zone where polymers from the upper layer and the lower layer are present. In this case, a loss of a distinct boundary occurs between the adjacent polymer layers. In conventional spin casting processes, there is little or no control of the make-up and uniformity of this dissolution layer. Uncontrolled dissolution of the polymers of adjacent layers can form localized pockets with high concentrations of the upper layer polymer and low concentrations of the lower layer polymer. If the amount of dissolution is extensive and occurs in an uncontrolled manner, it may promote scattering of light out of the waveguide.

One method of reducing the effects of solvent swelling to minimize stress is to deposit a very thin barrier layer between the lower and upper polymer layers. This method, however, requires additional processing steps to form the barrier layer to prevent ingress of the upper layer solvent into the lower polymer layer. Another method of stress reduction is to apply drying regimes in an attempt to produce a fully relaxed polymer layer that would not retract when exposed to the solvent used to form the next polymeric layer. These drying regimes, however, include long drying cycles, for example, and may require baking the substrate at high temperatures after each successive film deposition for two to three days in order to fully relax the polymer layer.

Thus, there is a need to overcome these and other problems of the prior art and to provide thin film optical waveguides with improved performance and reliability. The present invention, as illustrated in the following description, is directed to solving one or more of the problems set forth above.

SUMMARY OF THE INVENTION

To achieve the objects and in accordance with the purpose of the invention, as embodied and broadly described herein, in one exemplary embodiment, the invention relates to an optical element comprising a first polymeric layer and a second polymeric layer adjacent to the first polymeric layer and a method for making the optical waveguide are disclosed. The first polymeric layer has a refractive index of $n_1$ and solubility $S_1$ in a first solvent. The second polymeric layer has a refractive index of $n_2$ and solubility $S_2$ in the first solvent. In the optical waveguide, $n_1 \neq n_2$ and $S_1/S_2$ is at least 5.

Another exemplary embodiment of the invention relates to an optical waveguide having a first polymeric layer, a second polymeric layer adjacent to the first polymeric layer, and a third polymeric layer adjacent to the second polymeric layer. The first polymeric layer has a refractive index of $n_1$, a solubility of $S_1$ in a first solvent, and a solubility of $S_1$, in a second solvent. The second polymeric layer has a refractive index of $n_2$, a solubility of $S_2$ in the first solvent, a solubility of $S_2$, in a second solvent. Further, $n_1 \neq n_2$ and $S_1/S_2$ is at least 5. The third polymeric layer has a refractive index $n_3$, a solubility of $S_3$, in a second solvent. In addition, $n_2 \neq n_3$ and $S_2/S_3$, is at least 5.

Yet another exemplary embodiment of the invention is an optical waveguide having a first polymeric buffer layer, a first polymeric sublayer adjacent to the first polymeric buffer layer, a polymeric core layer adjacent to the first polymeric sublayer, a second sublayer adjacent the core layer, and a second buffer layer adjacent the second sublayer. The first polymeric buffer layer has a refractive index of $n_1$, a solubility of $S_1$ in a first solvent, and a solubility of $S_{1'}$ in a second solvent. The first polymeric sublayer has a refractive index of $n_2$, a solubility of $S_2$ in the first solvent, a solubility of $S_{2'}$ in a second solvent and the ratio of $S_1/S_2$ is at least 5. The polymeric core layer has a refractive index of $n_3$ and a solubility of $S_{3'}$ in the second solvent, wherein $n_3>n_2$, $n_3>n_1$, and $S_{2'}/S_{3'}$ is at least 5.

One exemplary embodiment of the invention, is an optical waveguide formed by providing a first polymeric layer, wherein the first polymeric layer has a refractive index of $n_1$. Also, a second polymeric layer having refractive index of $n_2$ adjacent to the first polymeric layer is formed by providing a solution over the first polymeric layer. The solution comprises a first solvent that dissolves about one percent or less of the first polymeric layer. In this embodiment, the value of $n_1$ does not equal the value of $n_2$.

Another exemplary embodiment of the invention relates to a method for making an optical waveguide comprising depositing a first polymeric layer and depositing a second polymeric layer adjacent to the first polymeric layer. In this embodiment, the first polymeric layer has a refractive index of $n_1$ and a solubility of $S_1$ in a first solvent. The second polymeric layer has a refractive index of $n_2$ and a solubility of $S_2$ in the first solvent. In addition, $n_1$ does not equal $n_2$ and $S_1/S_2$ is at least 5.

Yet another exemplary embodiment of the invention is a method for making an optical waveguide comprising providing a first polymeric layer and forming a second polymeric layer having refractive index of $n_2$ adjacent to the first polymeric layer by providing a solution over the first polymeric layer. The first polymeric layer has a refractive index of $n_1$. The solution comprises a first solvent that dissolves less than one percent of the first polymeric layer and $n_1 \neq n_2$.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
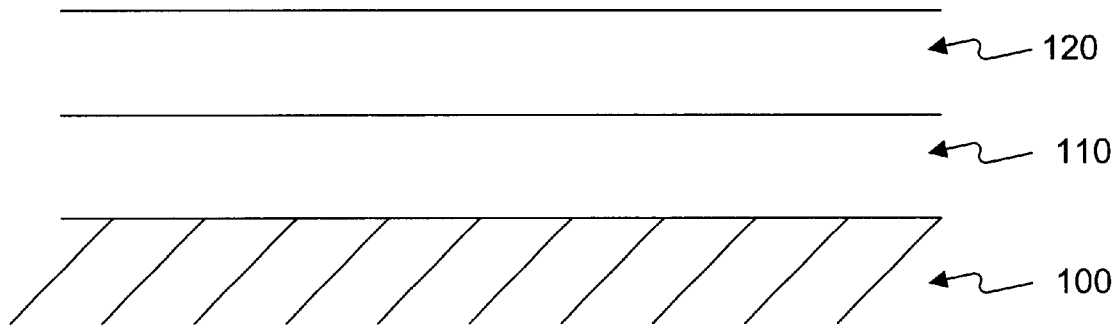
FIG. 1 is an optical element in accordance with an exemplary embodiment of the present invention.

Reference will now be made in detail to the present exemplary embodiments of the invention, examples of which are illustrated in the accompanying drawings. Wherever possible, the same reference numbers will be used throughout the drawing to refer to the same or like parts.

As used herein, the term "thin film optical waveguide" is interchangeable with "optical waveguide", "polymer waveguide", "polymer optical waveguide", and "waveguide." Unless otherwise distinguished, the term "solvent" means a single solvent and/or a mixture of two or more solvents. Also, the term "solubility" is understood to mean the amount of a material dissolved in one liter of solvent at a temperature of 20° C.

With reference to FIG. 1, a thin film polymeric element in accordance with an exemplary embodiment of the present invention is disclosed. The thin film polymeric element includes a first polymeric layer 110 on a substrate 100, and a second polymeric layer 120 adjacent to first polymeric layer 110. First polymeric layer 110 has a solubility of $S_1$ in a first solvent and a refractive index $n_1$. Second polymeric layer 120 has a solubility of $S_2$ in the first solvent and a refractive index $n_2$. In one exemplary embodiment, $n_1 \neq n_2$ and first polymeric layer 110 is more soluble in the first solvent than second polymeric layer 120, such that $S_1/S_2$ is at least 5. In another embodiment, $S_1/S_2$ is at least 10. In yet another embodiment, $S_1/S_2$ is at least 100.

Referring again to FIG. 1, an example of an optical element in accordance with the invention is disclosed. In the optical element first polymeric layer 110 may be, for example, a cladding layer on substrate 100, and second polymeric layer 120 may be, for example, a core layer on cladding layer 110. In an embodiment of the present invention, cladding layer 110 may be, for example, formed using CYTOP™ and core layer 120 may be, formed for example, using terpolymers of tetrafluoroethylene/ hexafluoropropylene/vinylidiene (THV). CYTOP™, manufactured by the Asahi Glass Co., Ltd., is a cyclized transparent optical polymer obtained by polymerization of perfluoro (alkenyl vinyl ethers). Both of these polymers are of high optical quality and their refractive indices differ such that $n_{THV}=n_{CYTOP}+0.02$, which allow single-mode waveguides to be made. THV is readily soluble in dimethyl acetamide (DMAC) while CYTOP™ is soluble in perfluorinated solvents, such as FC-40. THV is not soluble in FC-40 or perfluorinated solvents in general, and CYTOP™ is not soluble in DMAC. In this embodiment, $n_{CYTOP}$ is about 1.34 at 1550 nm and $n_{THV}$ is about 1.36 at 1550 nm. Substrate 100 can be any substrate conventionally used in the manufacture of optical elements, such as for example, a silicon substrate or a polymer substrate.

An optical element comprising CYTOP™ as a cladding layer and THV as a core layer was formed as follows. A CYTOP™ film of about 2.8 μm was deposited on a silicon substrate by spin coating twice from a 10% solution of CYTOP™ in FC-40. The spin coating speed was 1000 RPM for 10 seconds. After spin coating, the film was dried at 110° C. in a vacuum oven for several hours. The core THV layer was deposited by spin coating at 1000 RPM for 5 seconds. The spin coating solution was 15% of THV-G in DMAC. The film was then dried at 110° C. in a vacuum oven for several hours. The approximate layer thickness of the THV layer was 4 μm.

In another exemplary embodiment of the present invention, first polymeric layer can be a core layer having an index of refraction $n_1$, formed on substrate 100. Substrate 100 can be made from a material that acts as a cladding and has an index of refraction of $n_s$. In this embodiment, second polymeric layer 120 can be a cladding layer having an index of refraction of $n_2$. According to this arrangement, $n_1>n_2$, and $n_1>n_s$.

In another exemplary embodiment, when first polymeric layer 110 is a core layer and where second polymeric layer 120 is a cladding, layers 110 and 120 can form a repeating unit. In this case, the repeating unit can be stacked to form multiple units on substrate 100, comprising layers in an arrangement such as substrate 100, layer 110, layer 120, layer 110, layer 120. Layers 110 and 120 can repeat as called for in the desired structure. In addition, repeating core layers may have different indices of refraction as can repeating cladding layers 120. Alternatively, each repeating core layer may have the same index of refraction and/or each repeating cladding layer may have the same index of refraction. This allows for the same or different waveguides to be formed in the repeating structure.

Figure 2:
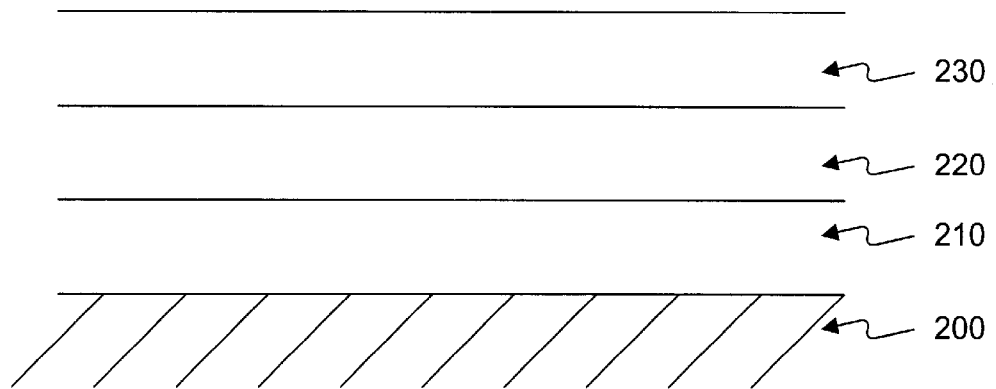
FIG. 2 is a three layer thin film polymeric waveguide in accordance with another exemplary embodiment of the present invention.

Another exemplary embodiment of a thin film polymeric waveguide in accordance with the present invention is depicted in FIG. 2. The thin film polymeric waveguide includes a first polymeric layer 210 on a substrate 200, a second polymeric layer 220 adjacent to first polymeric layer 210, and a third polymeric layer 230 adjacent to second polymeric layer 220. First polymeric layer 210 may be, for example, a first cladding layer, second polymeric layer 220 may be, for example, a core layer, and third polymeric layer 230 may be, for example, a second cladding layer. First cladding layer 210 has a solubility of $S_1$ in a first solvent and core layer 220 has a solubility of $S_2$ in the first solvent. First cladding layer 210 has a solubility of $S_{1'}$ in a second solvent and core layer 220 has a solubility of $S_{2'}$ in the second solvent. First cladding layer 210 is more soluble in the first solvent than core layer 220, such that $S_1/S_2$ is at least 5. In certain embodiments of the present invention, $S_1/S_2$ may be at least 10 and in other embodiments of the present invention, $S_1/S_2$ may be at least 100. Core layer 220 is more soluble in the second solvent than first cladding layer 210, such that $S_{2'}/S_{1'}$ is at least 5. In certain embodiments of the present invention $S_{2'}/S_{1'}$ may be at least 10 and in other embodiments of the present invention $S_{2'}/S_{1'}$ may be at least 100.

Second cladding layer 230 may have a solubility $S_{3''}$ in a third solvent and core layer 230 may have a solubility $S_{2''}$ in the third solvent. Second cladding layer 230 may be more soluble in the third solvent than core layer 220, such that $S_{3''}/S_{2''}$ is at least 5. In certain embodiments of the present invention $S_{3''}/S_{2''}$ may be at least 10 and in other embodiments of the present invention $S_{3''}/S_{2''}$ may be at least 100.

Second cladding layer 230 may have a solubility $S_{3'}$ in the second solvent such that $S_{2'}/S_{3'}$ is at least 5. In certain embodiments of the present invention $S_{2'}/S_{3'}$ may be at least 10 and in other embodiments of the present invention $S_{2'}/S_{3'}$ may be at least 100. Second cladding layer 230 may also comprise the same polymer as the first cladding layer 210 such that $S_1=S_3$, wherein $S_3$ is the solubility of the second cladding layer 230 in the first solvent, and $n_1=n_3$. Alternatively, second cladding layer 230 may comprise a different polymer than that of first cladding layer 210 such that $S_1 \neq S_2$ and/or $n_2 \neq n_3$.

In another exemplary embodiment of the present invention, the waveguide may include additional layers, such as, for example, a second core layer adjacent to the second cladding layer and a third cladding layer adjacent to the second core layer. In yet another exemplary embodiment the waveguide may also include additional layers, such as, for example, a third cladding layer adjacent to the second cladding layer, a second core layer adjacent to the third cladding layer, and a fourth cladding layer adjacent to the second core layer.

In another exemplary embodiment of the present invention, the optical waveguide may be channeled or patterned. Core and cladding layers may undergo channeling or patterning in order to confine light laterally rather than just within a particular film layer. As such, the optical waveguide may be tailored to meet a particular application criteria. In this manner, bi-dimensional confinement of optical modes in the optical waveguide may be formed. Vertically integrated devices may be formed when the optical waveguide in accordance with the invention comprises at least two core layers.

Figure 3:
FIG. 3 is a five layer thin film polymeric waveguide in accordance with an exemplary embodiment of the present invention.

Another optical waveguide in accordance with an exemplary embodiment of the present invention is shown in FIG. 3. The optical waveguide includes a first polymeric buffer layer 310 having a refractive index of $n_1$, a solubility $S_1$ in a first solvent, and a solubility $S_{1'}$ in a second solvent. First polymeric buffer layer 310 can be formed on a substrate 300. The optical waveguide further includes a first polymeric sublayer 320 adjacent to first polymeric buffer layer 310. First polymeric sublayer 320 has a refractive index of $n_2$, solubility $S_2$ in the first solvent, and solubility $S_{2'}$ in a second solvent. First polymeric buffer layer 310 is more soluble than first polymeric sublayer 320 in the first solvent, such that $S_1/S_2$ is at least 5. In certain embodiments of the present invention, $S_1/S_2$ may be at least 10 and in other embodiments of the present invention, $S_1/S_2$ may be at least 100.

The optical waveguide further includes a polymeric core layer 330 adjacent to first polymeric sublayer 320. Polymeric core layer 330 has a solubility $S_{3'}$ in the second solvent and a refractive index $n_3$, such that $n_3 > n_2$. First polymeric sublayer 320 is more soluble than core layer 330 in the second solvent such that $S_{2'}/S_{3'}$ is at least 5. In certain embodiments of the present invention, $S_{2'}/S_{3'}$ may be at least 10 and in other embodiments of the present invention $S_{2'}/S_{3'}$ may be at least 100. The optical waveguide further includes a second sublayer 340, having an index of refraction $n_4$, adjacent layer 330 and a second buffer layer 350, having an index of refraction $n_5$, adjacent second sublayer 340. Further, $n_3 > n_4$.

In another embodiment of the present invention, core layer 330 has a solubility of $S_{3''}$ in a third solvent, first polymeric sublayer 320 has a solubility of $S_{2''}$ in the third solvent, and $S_{3''}/S_{2''}$ is at least 5. In certain embodiments of the present invention, $S_{3''}/S_{2''}$ may be at least 10 and in other embodiments of the present invention, $S_{3''}/S_{2''}$ may be at least 100.

Referring again to FIG. 3, another optical waveguide in accordance with an exemplary embodiment of the present invention is a five layer waveguide having a first buffer layer 310 and a first sublayer 320, where first sublayer 320 is a cladding layer. In addition, a second buffer layer 350 and a second sublayer 340 may both be cladding layers. A core layer 330 is positioned between first sublayer 320 and second sublayer 340. The five layer waveguide may be used when more isolation from air or substrate 300 is desired than the three layer waveguide can afford. This may be the case, for example, when the substrate 300 or the top layer 350 has a highly absorbing metal electrode.

In this five layer waveguide, $d_1$ is the thickness of buffer layer 310, $d_2$ is the thickness of the first sublayer 320, $d_3$ is the thickness of the core layer 330, $d_4$ is the thickness of the second sublayer 340, and $d_5$ is the thickness of second buffer layer 350. Additionally, $d_2$ may be selected to be large enough to prevent the evanescent tail of the optical mode being propagated from reaching the air. Also, $d_4$ may be selected to be large enough to prevent the evanescent tail of the optical mode being propagated from reaching the film surface. The index of refraction of the core layer may be greater than the indices of refraction of the immediately adjacent cladding layers ($n_3 > n_4$ and $n_2$).

In addition, $n_2$ of the first sublayer 320 may be greater than $n_1$ of buffer layer 310, that is $n_2 > n_1$. In an embodiment of the present invention, the index of refraction of second buffer layer 350, $n_5$, may optionally have the same value as $n_1$, and the index of refraction of second sublayer 340, $n_4$, may optionally have the same value as $n_2$.

Figure 4:
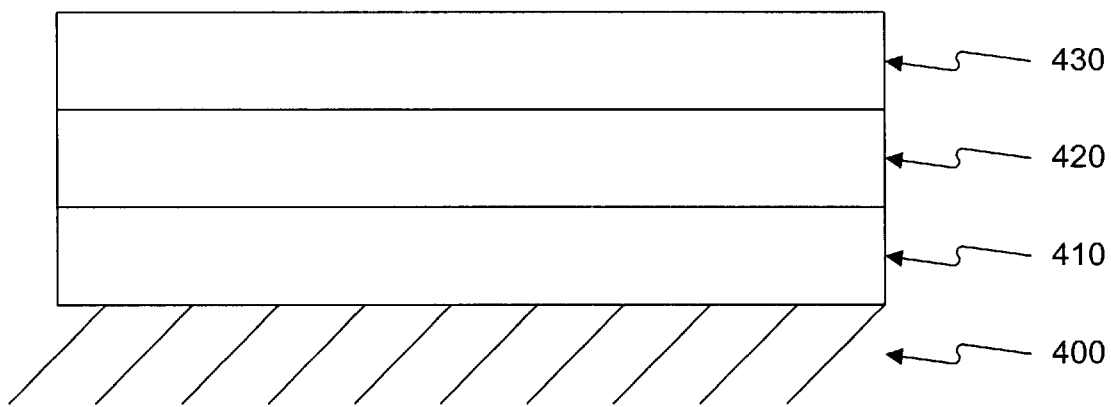
FIG. 4 a multi-layer thin film polymeric waveguide in accordance with an exemplary embodiment of the present invention.

In another exemplary embodiment of the present invention, there is a method for making an optical waveguide. As shown in FIG. 4, a first polymeric layer 410 having an index of refraction $n_1$ is provided on a substrate 400. A second polymeric layer 420, having refractive index of $n_2$, is formed adjacent to first polymeric layer 410. Second polymeric layer 420 is formed by providing a solution including a first solvent and the material of the second polymeric layer over the first polymeric layer by, for example, spin coating. Subsequent to drying, second polymeric layer 420 has refractive index $n_2$ and resides on first polymeric layer 410 such that first solvent has dissolved about one percent or less of the first polymeric layer.

In another exemplary embodiment of the present invention, the method for making an optical waveguide can further include forming a third polymeric layer 430 having a refractive index $n_3$ adjacent the second polymeric layer, wherein $n_2 \neq n_3$. Optionally, $n_1 = n_3$. A fourth polymeric layer (not shown) having a refractive index $n_4$ may also be formed adjacent the third polymeric layer, wherein $n_3 \neq n_4$. A fifth polymeric layer (not shown) having a refractive index $n_5$ may further be formed adjacent the fourth polymeric layer, wherein $n_4 \neq n_5$.

The various solvents which may be employed in accordance with the present invention are those solvents known to the skilled artisan to be compatible with the specific polymers selected to form a given layer (core, cladding, buffer). It should be kept in mind, that the specific solvent/polymer system of one layer must also comply with the polymer/solvent system of any adjacent layer in accordance with the requirements of the present invention. Requirements may include, for example, the solubility of a first polymeric layer in first solvent is greater than the solubility of a second polymeric layer in the first solvent by at least 5, 10, or 100. Alternatively, although not to the exclusion of the solubility requirement stated above, forming the second polymeric layer on the first polymeric layer dissolves about one percent or less of the first layer.

Each particular layer (cladding, core, buffer) of the optical waveguide comprises at least one polymer. It is also possible for a particular layer to further comprise at least one agent known to one of ordinary skill in the art to be useful in the production of polymer waveguides. Non-limiting representatives of agents are chosen, for example, from doping agents, crosslinking agents, chromophoric doping agents, chain transfer agents, anti-oxidants, and photoinitiators.

Suitable polymers which may be utilized as core layers and cladding layers are those known to one of ordinary skill to have refractive indices that meet ordinary waveguide criteria, i.e., the refractive index of the cladding layer is less than the refractive index of the core layer. Refractive index differences coupled with the thin film dimensions play a major part in the determination of total number of modes guided by the waveguide. In addition to suitable optical relationships, the polymers and solvents chosen for adjacent layers should also meet the solubility relationships as disclosed above.

For many optical communications applications, a single-mode waveguide is required. By suitably choosing the core and cladding polymers and a suitable solvent as well as each corresponding polymer's deposited thickness, multilayer polymer stacks can be fabricated with greatly reduced stress and cracking, leading to improved device performance, yield, and reliability.

Non-limiting representatives of suitable core layers are chosen from chirped layers, multimode layers, and graded index layers. The core layers can be made from numerous materials such as, rare-earth-doped polymers, other electro-optically active polymers and blends thereof. The core layer may be composed of polymers that have low optical loss such as for example, CYTOP™, TEFLON® AF™, perfluorocyclobutane, polynorbornene, fluorinated polyimide, polyvinyl alcohol, polymethylmethacrylate, multifunctional crosslinking acrylates. TEFLON® AF™ is a family of amorphous fluoropolymer resins manufactured by E.I. duPont de Nemours and Company.

In addition, the polymers forming the core layer, including the above-mentioned ones, can be doped with suitable rare earth species and electro-optic chromophores to achieve amplification and electro-optic modulation capability, respectively. Other non-limiting representatives of core layer polymers may include those polymers that would consist of the initial backbone materials such as CYTOP™ with rare earth or electro-optic species chemically incorporated into the polymer, either in the main chain or in the side chain.

Non-limiting representatives of polymer/solvent parings which may be used to form an optical element in accordance with the present invention include: CYTOP™ (FC-40)/THV (DMAC); polyvinyl alcohol (water)/CYTOP™ (FC-40); polyvinyl alcohol (water)/THV(DMAC), polymethylmethacrylate (cyclohexanone)/polyvinyl alcohol (water); polymethylmethacrylate (cyclohexanone)/CYTOP™ (FC40).

The present invention addresses the problems of reducing stresses and controlling dissolution zones of a thin film optical waveguide through careful selection of polymers used in each layer of the structure based on their solvent solubility and refractive indices. As was previously mentioned, in the production of thin film optical waveguides, the refractive index of the guiding layer (core layer) is higher than the refractive index of the buffer and cladding layers so that the optical modes can be conducted into the guiding layer by internal reflection.

This invention provides a means of reducing stresses caused by solvent swelling when polymer optical waveguides are fabricated by conventional solution coating technologies such as spray coating, dip coating, meniscus coating, and casting.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

what is claimed is:

1. An optical element comprising:
a first polymeric layer, wherein the first polymeric layer has a refractive index of $n_1$ and solubility $S_1$ in a first solvent; and
a second polymeric layer adjacent to the first polymeric layer, wherein the second polymeric layer has a refractive index of $n_2$ and solubility $S_2$ in the first solvent; and wherein $n_1 \neq n_2$ and $S_1/S_2$ is at least 5.

2. The optical element of claim 1, wherein the first polymeric layer has solubility $S_{1'}$ in a second solvent, the second polymeric layer has solubility $S_{2'}$ in the second solvent, and $S_{2'}/S_{1'}$ is at least 5.

3. The optical element of claim 1, wherein $S_1/S_2$ is at least 10.

4. The optical element of claim 1, wherein $S_1/S_2$ is at least 100.

5. The optical element of claim 1, wherein at least one polymeric layer chosen from the first polymeric layer and the second polymeric layer is channeled.

6. An optical waveguide comprising:
   a first polymeric layer, wherein the first polymeric layer has a refractive index of $n_1$, solubility $S_1$ in a first solvent, and solubility $S_{1'}$ in a second solvent;
   a second polymeric layer adjacent to the first polymeric layer, wherein the second polymeric layer has a refractive index of $n_2$, solubility $S_2$ in the first solvent, solubility $S_{2'}$ in the second solvent and wherein $n_1 \neq n_2$ and $S_1/S_2$ is at least 5; and
   a third polymeric layer adjacent to the second polymeric layer, wherein the third polymeric layer has a refractive index $n_3$, solubility $S_{3'}$ in the second solvent and wherein $n_2 \neq n_3$ and $S_{2'}/S_{3'}$ is at least 5.

7. The optical waveguide of claim 6, wherein $S_1/S_2$ is at least 10.

8. The optical waveguide of claim 6, wherein $S_1/S_2$ is at least 100.

9. The optical waveguide of claim 6, wherein $S_{2'}/S_{3'}$ is at least 10.

10. The optical waveguide of claim 6, wherein $S_{2'}/S_{3'}$ is at least 100.

11. The optical waveguide of claim 6, wherein the third polymeric layer has solubility $S_3$ in the first solvent, and further wherein $S_1=S_3$, and $n_1=n_3$.

12. The optical waveguide of claim 6, wherein the third polymeric layer has a solubility of $S_{3''}$ in a third solvent, the second polymeric layer has a solubility of $S_{2''}$ in the third solvent, and $S_{3''}/S_{2''}$ is at least 5.

13. The optical waveguide of claim 6, wherein the first polymeric layer is a first cladding layer, the second polymeric layer is a core layer, and the third polymeric layer is a second cladding layer, the optical waveguide further comprising:
   a second core layer adjacent to the second cladding layer; and
   a third cladding layer adjacent to the second core layer.

14. The optical waveguide of claim 6, wherein the first polymeric layer is a first cladding layer, the second polymeric layer is a first core layer, and the third polymeric layer is a second cladding layer, the optical waveguide further comprising:
   a third cladding layer adjacent to the second cladding layer;
   a second core layer adjacent to the third cladding layer; and
   a fourth cladding layer adjacent the second core layer.

15. The optical waveguide of claim 14, wherein at least one layer chosen from the first core layer, the second core layer, the first cladding layer, the second cladding layer, the third cladding layer and the fourth cladding layer, is channeled.

16. The optical waveguide of claim 6, wherein the first polymeric layer is core layer, the second polymeric layer is a cladding layer, and $n_1>n_2$.

17. An optical waveguide comprising:
   a first polymeric buffer layer, wherein the first polymeric buffer layer has a refractive index of $n_1$, a solubility $S_1$ in a first solvent, and a solubility $S_{1'}$ in a second solvent;
   a first polymeric sublayer adjacent to the first polymeric buffer layer, wherein the first polymeric sublayer has a refractive index of $n_2$, solubility $S_2$ in the first solvent, solubility $S_{2'}$ in the second solvent and wherein $S_1/S_2$ is at least 5;
   a polymeric core layer adjacent to the first polymeric sublayer, wherein the polymeric core layer has a refractive index $n_3$ and a solubility $S_{3'}$ in the second solvent and wherein $n_3>n_2$, $n_3>n_1$, and $S_{2'}/S_{3'}$ is at least 5;
   a second sublayer adjacent the core layer; and
   a second buffer layer adjacent the second sublayer.

18. The optical waveguide of claim 17, wherein $S_1/S_2$ is at least 10.

19. The optical waveguide of claim 17, wherein $S_{2'}/S_{3'}$ is at least 10.

20. The optical waveguide of claim 17, wherein the polymeric core layer has a solubility of $S_{3''}$ in a third solvent, the first polymeric sublayer has a solubility of $S_{2''}$ in the third solvent, and $S_{3''}/S_{2''}$ is at least 5.

21. An optical waveguide formed by:
   providing a first polymeric layer, wherein the first polymeric layer has a refractive index of $n_1$; and
   forming a second polymeric layer having refractive index of $n_2$ adjacent to the first polymeric layer by providing a solution over the first polymeric layer, wherein the solution comprises a first solvent that dissolves about one percent or less of the first polymeric layer and wherein $n_1 \neq n_2$.

22. The optical waveguide of claim 21, further including forming a third polymeric layer having refractive index $n_3$ adjacent to the second polymeric layer by providing a solution over the second polymeric layer, wherein the solution comprises a second solvent that dissolves about one percent or less of the second polymeric layer and wherein $n_2 \neq n_3$.

23. The optical waveguide of claim 21, wherein the first polymeric layer is a first cladding layer, the second polymeric layer is a first core layer, and the third polymeric layer is a second cladding layer, the optical waveguide further comprising:
   a third cladding layer adjacent to the second cladding layer,
   a second core layer adjacent to the third cladding layer, and
   a fourth cladding layer adjacent the second core layer.

24. The optical waveguide of claim 21, wherein the first polymeric layer is a first cladding layer, the second polymeric layer is a second cladding layer, and the third polymeric layer is a first core layer, the optical waveguide further comprising:
   a third cladding layer adjacent to the first core layer,
   a second core layer adjacent to the third cladding layer, and
   a fourth cladding layer adjacent the second core layer.

25. A method for making an optical waveguide comprising:
   depositing a first polymeric layer, wherein the first polymeric layer has a refractive index of $n_1$ and a solubility $S_1$ in a first solvent; and
   depositing a second polymeric layer adjacent to the first polymeric layer, wherein the second polymeric layer has a refractive index of $n_2$ and a solubility $S_2$ in the first solvent, and wherein $n_1 \neq n_2$ and $S_1/S_2$ is at least 5.

26. The method of claim 25, wherein the first polymeric layer has solubility $S_{1'}$ in a second solvent, the second polymeric layer has solubility $S_{2'}$ in a second solvent, and $S_{2'}/S_{1'}$ is at least 5.

27. The method of claim 25, wherein $S_1/S_2$ is at least 10.

28. The method of claim 25, wherein $S_1/S_2$ is at least 100.

29. A method for making an optical waveguide comprising:

providing a first polymeric layer, wherein the first polymeric layer has a refractive index of $n_1$; and forming a second polymeric layer having refractive index of $n_2$ adjacent to the first polymeric layer by providing a solution over the first polymeric layer, wherein the solution comprises a first solvent that dissolves less than one percent of the first polymeric layer and $n_1 \neq n_2$.

30. The method of claim 29, further comprising forming a third polymeric layer having a refractive index $n_3$ adjacent the second polymeric layer, wherein $n_2 \neq n_3$.

31. The method of claim 30, further comprising:

forming a fourth polymeric layer having a refractive index $n_4$ adjacent the third polymeric layer, wherein $n_3 \neq n_4$; and forming a fifth polymeric layer having a refractive index $n_5$ adjacent the fourth polymeric layer, wherein $n_4 \neq n_5$.

32. An optical element comprising:

a core layer on a substrate, wherein the core layer has a refractive index of $n_1$ and solubility $S_1$ in a first solvent; and a cladding layer adjacent to the core layer, wherein the cladding layer has a refractive index of $n_2$ and solubility $S_2$ in the first solvent; and wherein $n_1 \neq n_2$ and $S_1/S_2$ is at least 5.

33. The optical element of claim 32, wherein the core layer and the cladding layer form a first unit, and wherein the optical element further comprises at least a second unit formed adjacent to the first unit.

* * * * *